United States Patent
Han et al.

(10) Patent No.: US 12,401,065 B2
(45) Date of Patent: Aug. 26, 2025

(54) ELECTROLYTE FOR LITHIUM SECONDARY BATTERY, AND LITHIUM SECONDARY BATTERY COMPRISING SAME

(71) Applicant: LG ENERGY SOLUTION, LTD., Seoul (KR)

(72) Inventors: Suenghoon Han, Daejeon (KR); Eui Tae Kim, Daejeon (KR); Jaegil Lee, Daejeon (KR); Kyungsik Hong, Daejeon (KR); Seonghyo Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 643 days.

(21) Appl. No.: 17/770,108

(22) PCT Filed: Mar. 31, 2021

(86) PCT No.: PCT/KR2021/004020
§ 371 (c)(1),
(2) Date: Apr. 19, 2022

(87) PCT Pub. No.: WO2021/210814
PCT Pub. Date: Oct. 21, 2021

(65) Prior Publication Data
US 2022/0393242 A1 Dec. 8, 2022

(30) Foreign Application Priority Data
Apr. 17, 2020 (KR) .................. 10-2020-0046363

(51) Int. Cl.
H01M 10/0569 (2010.01)
H01M 10/0567 (2010.01)
(Continued)

(52) U.S. Cl.
CPC .... H01M 10/0569 (2013.01); H01M 10/0567 (2013.01); H01M 10/0568 (2013.01); H01M 10/36 (2013.01); *H01M 2300/0037* (2013.01)

(58) Field of Classification Search
CPC ......... H01M 10/0569; H01M 10/0567; H01M 10/0568; H01M 10/36; H01M 2300/0037; H01M 4/38; H01M 10/052; Y02E 60/10
See application file for complete search history.

(56) References Cited

U.S. PATENT DOCUMENTS

2002/0045102 A1* 4/2002 Jung ................ H01M 4/5815
429/105
2003/0073005 A1 4/2003 Kim et al.
(Continued)

FOREIGN PATENT DOCUMENTS

CN 104051786 A 9/2014
CN 107534184 A 1/2018
(Continued)

OTHER PUBLICATIONS

English Translation Dec. 3, 2024 CN110148787 (Year: 2019).*
(Continued)

*Primary Examiner* — Allison Bourke
*Assistant Examiner* — Kayla Elaine Clary
(74) *Attorney, Agent, or Firm* — Birch, Stewart, Kolasch & Birch, LLP

(57) ABSTRACT

An electrolyte solution for a lithium secondary battery, including a first solvent comprising a heterocyclic compound having at least one double bond, and any one of an oxygen atom and a sulfur atom; a second solvent including at least one of an ether-containing compound, an ester-containing compound, an amide-containing compound, and a carbonate-containing compound; a lithium salt; lanthanum nitrate; and an additive including lithium nitrate.

4 Claims, 4 Drawing Sheets

(51) Int. Cl.
    *H01M 10/0568*     (2010.01)
    *H01M 10/36*     (2010.01)

(56) References Cited

U.S. PATENT DOCUMENTS

| | | |
|---|---|---|
| 2005/0175904 A1 | 8/2005 | Gorkovenko |
| 2006/0199080 A1 | 9/2006 | Amine et al. |
| 2007/0212615 A1 | 9/2007 | Jost et al. |
| 2014/0342242 A1 | 11/2014 | Egorov et al. |
| 2016/0322665 A1 | 11/2016 | Kim et al. |
| 2016/0336625 A1 | 11/2016 | Jeong et al. |
| 2018/0294476 A1 | 10/2018 | Zhamu et al. |
| 2019/0051940 A1 | 2/2019 | Park et al. |
| 2020/0044281 A1 | 2/2020 | Zhu et al. |
| 2020/0106132 A1 | 4/2020 | Yang et al. |

FOREIGN PATENT DOCUMENTS

| | | | |
|---|---|---|---|
| CN | 107645016 A | | 1/2018 |
| CN | 108281659 A | | 7/2018 |
| CN | 109119573 A | | 1/2019 |
| CN | 109256582 A | | 1/2019 |
| CN | 110148787 | * | 6/2019 |
| CN | 110148787 A | | 8/2019 |
| CN | 110199426 A | | 9/2019 |
| CN | 1336696 A | | 2/2022 |
| EP | 1 178 555 A2 | | 2/2002 |
| EP | 3 282 514 A1 | | 2/2018 |
| JP | 2002-75446 A | | 3/2002 |
| JP | 2007-522638 A | | 8/2007 |
| JP | 2008-532248 A | | 8/2008 |
| JP | 2018-1567 A | | 1/2016 |
| JP | 2016-219411 A | | 12/2016 |
| JP | 2018-519620 A | | 7/2018 |
| KR | 10-2003-0031396 A | | 4/2003 |
| KR | 10-2005-0041098 A | | 5/2005 |
| KR | 10-0578797 B1 | | 5/2006 |
| KR | 10-2006-0135958 A | | 12/2006 |
| KR | 10-2007-0027512 A | | 3/2007 |
| KR | 10-2008-0067964 A | | 7/2008 |
| KR | 10-1166275 B1 | | 7/2012 |
| KR | 10-2014-0135038 A | | 11/2014 |
| KR | 10-2015-0072239 A | | 6/2015 |
| KR | 10-2016-0128014 A | | 11/2016 |
| KR | 10-1683949 B1 | | 12/2016 |
| KR | 10-2017-0067648 A | | 6/2017 |
| KR | 10-2017-0082280 A | | 7/2017 |
| KR | 10-1752866 B1 | | 7/2017 |
| KR | 10-1994879 B1 | | 7/2019 |
| KR | 10-2019-0092149 A | | 8/2019 |
| KR | 10-2050836 B1 | | 12/2019 |
| KR | 10-2020-0014685 A | | 2/2020 |
| WO | WO 2018/208153 A1 | | 10/2019 |

OTHER PUBLICATIONS

Chao et al., "Solid-State Microelectrochemistry: Electrical Characteristics of a Solid-State Microelectrochemical Transistor Based on Poly(3-methylthiophene)", Journal of the American Chemical Society, 1987, vol. 109, No. 7, pp. 2197-2199.

International Search Report (PCT/ISA/210) issued in PCT/KR2021/004020 mailed on Jul. 7, 2021.

Kang et al., "A review of recent developments in rechargeable lithium-sulfur batteries", Nanoscale, 2016, vol. 8, pp. 16541-16588.

Liu et al., "Lanthanum Nitrate As Electrolyte Additive To Stabilize the Surface Morphology of Lithium Anode for Lithium-Sulfur Battery". ACS Appl. Mater. Interfaces 2016, vol. 8, No. 12, pp. 7783-7789.

Wu et al., "Enhanced Cycling Stability of Sulfur Cathode Surface-Modified byPoly(N-methylpyrrole)". Electrochimica Acta, 2014, vol. 135, pp. 108-113.

Yang et al., "Pyrrole as a promising electrolyte additive to trap polysulfides for lithium-sulfur batteries". Journal of Power Sources, 2017, vol. 348, pp. 175-182.

Zhao et al., "Anode Interface Engineering and Architecture Design for High-Performance Lithium-Sulfur Batteries", Adv. Mater., 2019, vol. 31, 1806532, pp. 1-27.

Extended European Search Report for European Application No. 21789100.1, dated Mar. 30, 2023.

Jin et al., "A Novel Strategy for High-Stability Lithium Sulfur Batteries by in Situ Formation of Polysulfide Adsorptive-Blocking Layer", Journal of Power Sources, vol. 355, Apr. 22, 2017, pp. 147-153.

* cited by examiner

[Figure 1]
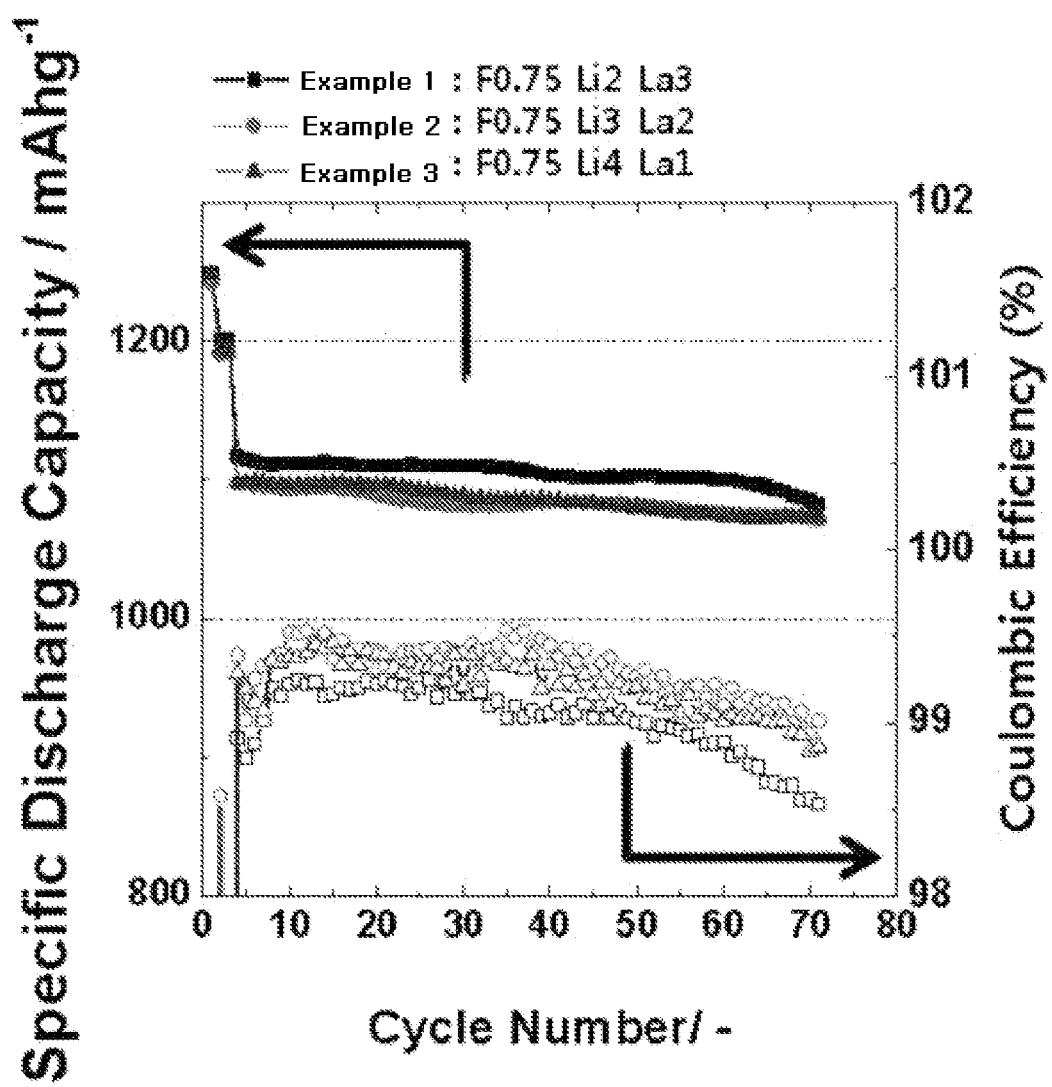

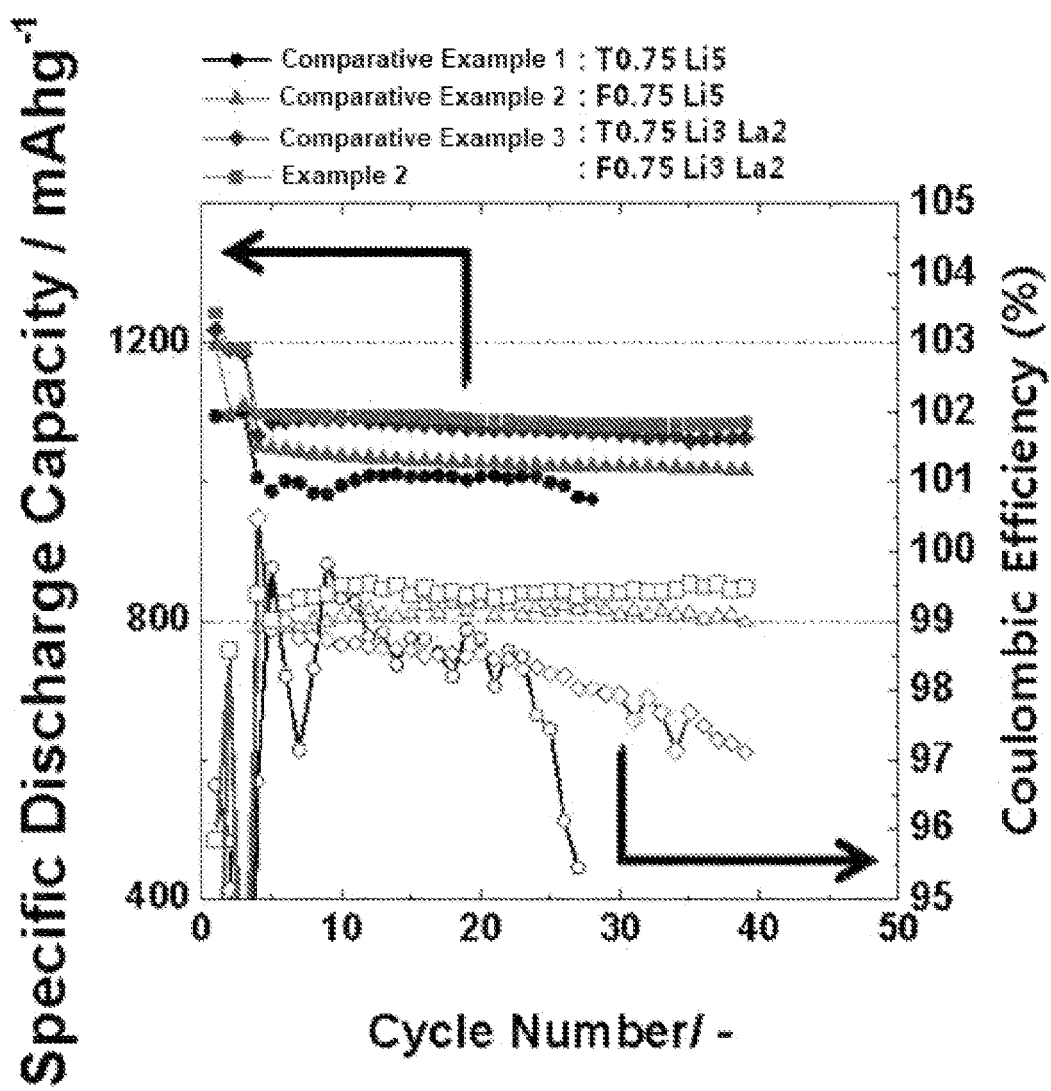
[Figure 2]

[Figure 3]
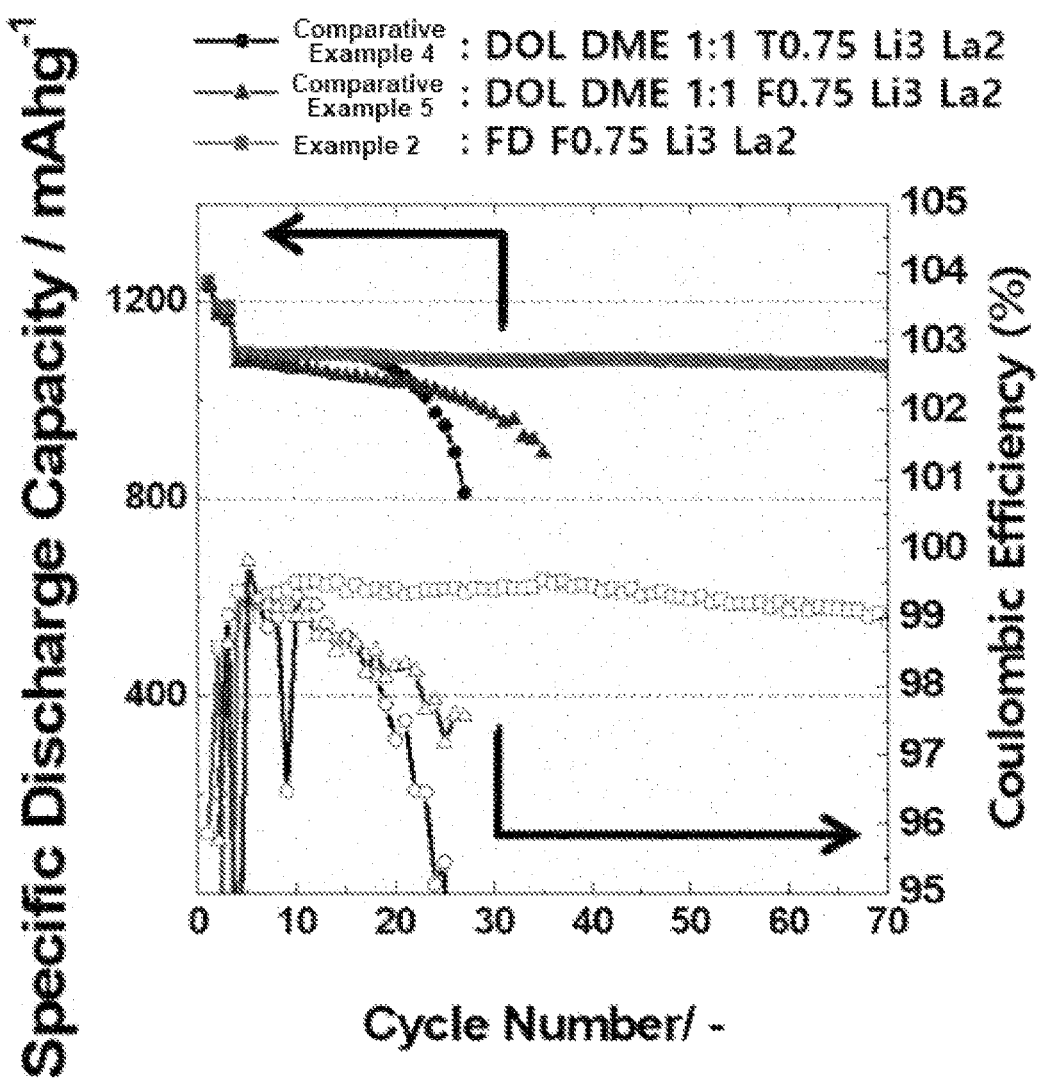

[Figure 4]
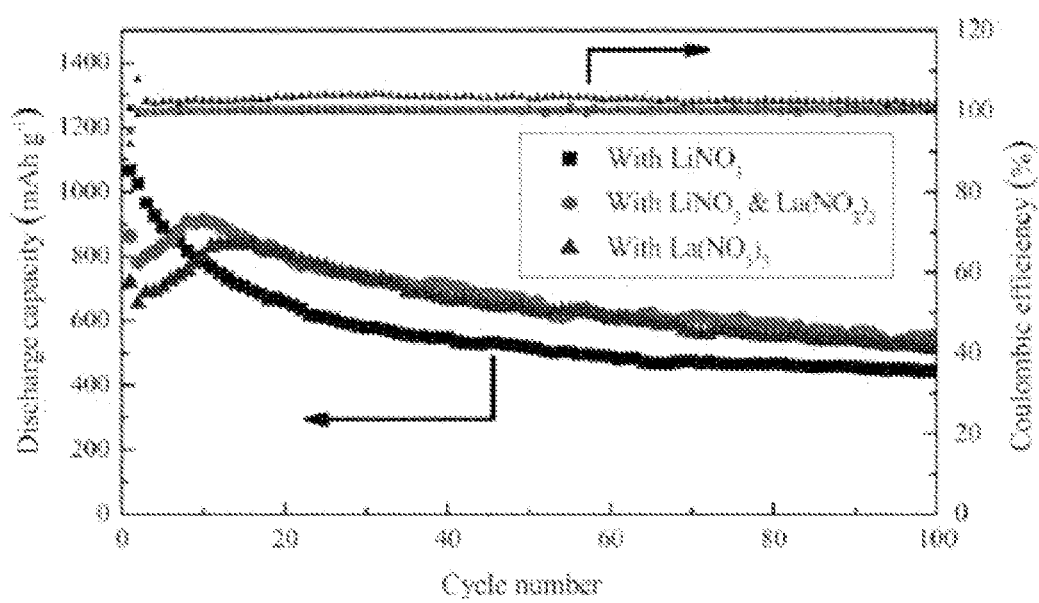

ELECTROLYTE FOR LITHIUM SECONDARY BATTERY, AND LITHIUM SECONDARY BATTERY COMPRISING SAME

TECHNICAL FIELD

The present application claims the benefit of priority based on Korean Patent Application No, 10-2020-0046363 filed on Apr. 17, 2020, the entire contents of which are incorporated herein by reference.

The present invention relates to an electrolyte solution for a lithium secondary battery and a lithium secondary battery comprising the same, more particularly, to an electrolyte solution for a lithium secondary battery and a lithium secondary battery comprising the same, which can improve the performance of the battery by combining a highly reactive solvent and lithium salt which can increase the capacity of the battery, and a highly stable solvent and lithium salt which can increase the lifetime of the battery.

BACKGROUND ART

As an interest in energy storage technology increases, the application field thereof extends to mobile phones, tablets, laptops, and camcorders, and further to electric vehicles (EVs) and hybrid electric vehicles (HEVs), research and development of electrochemical devices are gradually increasing. Electrochemical devices are the field that is receiving the most attention in this respect, and among them, the development of secondary batteries such as a lithium-sulfur battery capable of charging and discharging has been a focus of interest. In recent years, in order to improve the capacity density and specific energy in developing such a battery, research and development on the design of new electrodes and batteries have been conducted.

Among such electrochemical devices, a lithium-sulfur battery (Li—S battery) has a high energy density (theoretical capacity) and thus is in the spotlight as a next-generation secondary battery that can replace the lithium ion-battery. In such a lithium-sulfur battery, the reduction reaction of sulfur and the oxidation reaction of lithium metal take place during discharging, and at this time, sulfur forms lithium polysulfide (LiPS) having a linear structure from $S_8$ having a cyclic structure. This lithium-sulfur battery is characterized by showing a stepwise discharging voltage until the polysulfide is completely reduced to $Li_2S$.

However, the biggest obstacle in the commercialization of the lithium-sulfur battery is lifetime, and during the charging/discharging process, the charging/discharging efficiency is reduced and the lifetime of the battery is deteriorated. The causes of such deterioration of the lifetime of the lithium-sulfur battery are various, such as the side reactions of the electrolyte solution (deposition of by-products due to the decomposition of the electrolyte solution), the instability of lithium metal (dendrite grows on the lithium negative electrode, causing a short circuit), and the deposition of positive electrode by-products (leaching of lithium polysulfide from the positive electrode).

That is, in a battery using a sulfur-based compound as a positive electrode active material and using an alkali metal such as lithium as a negative electrode active material, the leaching and shuttle phenomenon of lithium polysulfide occurs during charging/discharging, and the lithium polysulfide is transferred to the negative electrode, thereby reducing the capacity of the lithium-sulfur battery, and thus the lithium-sulfur battery has a major problem in that its lifetime is reduced and its reactivity is reduced. That is, since polysulfide leached from the positive electrode has high solubility in the organic electrolyte solution, it can undesirably move toward the negative electrode (PS shuttling) through the electrolyte solution. As a result, a decrease in capacity occurs due to irreversible loss of the positive electrode active material, and a decrease in the lifetime of the battery occurs due to deposition of sulfur particles on the surface of the lithium metal by side reactions.

Meanwhile, the behavior of such a lithium-sulfur battery can vary greatly depending on the electrolyte solution. The electrolyte solution when sulfur in the positive electrode is leached into the electrolyte solution in the form of lithium polysulfide (LiPS) is called Catholyte and the electrolyte solution when sulfur hardly leaches out in the form of lithium polysulfide is called sparingly soluble or solvating electrolyte (SSE). That is, in the art, various studies on a lithium-sulfur battery in which sulfur, a positive electrode active material, does not elute into the electrolyte solution (studies such as adding LiPS adsorption material to positive electrode composites or modifying separators made of existing PE, etc.) are being conducted, and in particular, studies on an electrolyte solution capable of proceeding a solid-to-solid reaction in which sulfur is converted to $Li_2S$, the final discharging product are also being conducted, but it has not yet achieved such results. Accordingly, there is a need for a more fundamental method to suppress phenomena that lithium polysulfide moves to the negative electrode and thus decreases the lifetime of the lithium-sulfur battery, and that the reactivity decreases due to a large amount of lithium polysulfide.

Therefore, in the art, in effort of preventing the problem of side reactions of the electrolyte solution, attempts are being made to change the previously known electrolyte solution containing an ether-based solvent, etc. to an electrolyte solution containing also nitric acid-based compounds such as lanthanum nitrate $(La(NO_3)_3)$, but a fundamental solution is still difficult.

That is, lanthanum nitrate has advantages such as improving the coulombic efficiency of a lithium-sulfur battery, and is therefore often used as an electrolyte solution for a lithium-sulfur battery. In this regard, ACS APPLIED MATERIALS & INTERFACES 2016, 8, P. 7783-7789, a non-patent document (paper), discloses a lithium-sulfur battery to which lanthanum nitrate $(La(NO_3)_3)$ is applied as an electrolyte additive that stabilizes the surface, specifically discloses an electrolyte for a lithium-sulfur battery comprising even 1,3-dioxolane (DOL), dimethoxyethane (DME), and LiTFSI in addition to lanthanum nitrate, but does not still fundamentally improve the problem of deteriorating the lifetime of the lithium-sulfur battery.

Accordingly, there is a need to develop a new electrolyte solution for the lithium secondary battery that can innovatively improve the lifetime performance of a lithium-sulfur battery while using lanthanum nitrate which is effective in improving the coulombic efficiency of the lithium-sulfur battery.

PRIOR ART DOCUMENT

Non-Patent Document (Paper 1) ACS APPLIED MATERIALS & INTERFACES 2016, 8, P. 7783-7789

DISCLOSURE

Technical Problem

Therefore, it is an object of the present invention to provide an electrolyte solution for a lithium secondary battery and a lithium secondary battery comprising the same, which can improve the performance of the battery by combining a highly reactive solvent and lithium salt which can increase the capacity of the battery, and a highly stable solvent and lithium salt which can increase the lifetime of the battery.

Technical Solution

In order to achieve the above object, the present invention provides an electrolyte solution for a lithium secondary battery, which comprises a first solvent comprising a heterocyclic compound having at least one double bond, and any one of an oxygen atom and a sulfur atom; a second solvent comprising at least one of an ether-containing compound, an ester-containing compound, an amide-containing compound, and a carbonate-containing compound; lithium salt; lanthanum nitrate; and an additive comprising lithium nitrate.

In addition, the present invention provides a lithium secondary battery comprises a positive electrode; a negative electrode; a separator interposed between the positive electrode and the negative electrode; and the electrolyte solution for the lithium secondary battery.

Advantageous Effects

According to the electrolyte solution for the lithium secondary battery and the lithium secondary battery comprising the same according to the present invention, the performance of the battery can be improved by combining a highly reactive solvent and lithium salt which can increase the capacity of the battery, and a highly stable solvent and lithium salt which can increase the lifetime of the battery, and a lithium salt. More specifically, it has an advantage of improving battery performance such as cycle lifetime by further comprising lanthanum nitrate which has advantages such as improving the coulombic efficiency of the lithium-sulfur battery.

DESCRIPTION OF DRAWINGS

FIG. 1 is a graph showing coulombic efficiency, discharging capacity, and lifetime performance of the lithium secondary battery manufactured according to an embodiment of the present invention.

FIGS. 2 and 3 are graphs showing coulombic efficiency, discharging capacity, and lifetime performance of lithium secondary batteries manufactured according to an embodiment of the present invention and a comparative example.

FIG. 4 is a graph showing coulombic efficiency, discharging capacity, and lifetime performance of a typical lithium secondary battery.

BEST MODE

Hereinafter, the present invention will be described in detail.

The electrolyte solution for the lithium secondary battery according to the present invention comprises A) the first solvent comprising a heterocyclic compound containing one or more double bonds and at the same time, containing any one of an oxygen atom and a sulfur atom, B) the second solvent comprising at least one of an ether-based compound, an ester-based compound, an amide-based compound, and a carbonate-based compound, C) lithium salt, D) lanthanum nitrate and E) an additive comprising lithium nitrate.

As described above, at the present time when the development of a new electrolyte solution for the lithium secondary battery capable of dramatically improving the lifetime performance of the battery while using lanthanum nitrate, which is effective in improving the coulombic efficiency of the lithium-sulfur battery, is required, the applicant of the present invention has developed an electrolyte solution for the lithium secondary battery, which can enhance the capacity of the battery by combining a highly reactive solvent and lithium salt which can increase the capacity of the battery, and a highly stable solvent and lithium salt which can increase the lifetime of the battery, and more specifically which can enhance battery performance such as cycle lifetime by combining lanthanum nitrate, which has advantages such as improving the coulombic efficiency of the lithium-sulfur battery, with a compound used as a component of an existing electrolyte solution.

That is, the electrolyte solution applicable to a lithium secondary battery such as a lithium-sulfur battery leads to a difference in performance such as lifetime or efficiency of the battery depending on the type of organic solvent and lithium salt (Li-Salt) contained in the electrolyte solution. Accordingly, after repeated studies to find a way to improve the performance of the battery by combining a highly reactive solvent and lithium salt which can increase the capacity of the battery, and a highly stable solvent and lithium salt which can increase the lifetime of the battery, the applicant of the present invention has derived the present invention with improved reactivity and lifetime by, i) incorporating 'lanthanum nitrate ($La(NO_3)_3$)', which has advantages such as improving the coulombic efficiency of a lithium-sulfur battery, into an electrolyte solution (exactly, replacing a part of $LiNO_3$ used as a component of the existing electrolyte solution), and at the same time, ii) changing 1,3-dioxolane (DOL) used as a component of the existing electrolyte solution to 'a solvent comprising a heterocyclic compound containing one or more double bonds and any one of an oxygen atom and a sulfur atom (the first solvent)', and iii) also, likewise, changing LiTFSI used as a component of the existing electrolyte solution to another lithium salt such as LiFSI.

Hereinafter, each of A) the first solvent, B) the second solvent, C) lithium salt, D) lanthanum nitrate and E) the additive comprising lithium nitrate comprised in the electrolyte solution for the lithium secondary battery of the present invention will be described in detail.

A) First Solvent

The first solvent comprises a heterocyclic compound containing one or more double bonds and at the same time containing any one of an oxygen atom and a sulfur atom, which has the property of being difficult to dissolve salts due to the delocalization of the lone pair electrons of the hetero atom (oxygen atom or sulfur atom), and thus can suppress the generation of lithium dendrites by forming a polymer protective film (solid electrolyte interface, SEI layer) on the surface of a lithium-based metal (negative electrode) by a ring opening reaction of a heterocyclic compound in the initial discharging stage of the battery, and can further improve the lifetime characteristics by reducing the decomposition of the electrolyte solution on the surface of lithium-based metal and subsequent side reactions.

That is, the heterocyclic compound of the present invention must contain one or more double bonds in order to form a polymeric protective film on the surface of a lithium-based metal, and must also contain a hetero atom (oxygen atom or sulfur atom) to exhibit an effect such as increasing the affinity with other solvents in the electrolyte solution by making it polar.

The heterocyclic compound may be a 3 to 15 membered, preferably 3 to 7 membered, more preferably 5 to 6 membered heterocyclic compounds. In addition, the heterocyclic compound may be a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group ($-NO_2$), an amine group ($-NH_2$), and a sulfonyl group ($-SO_2$). In addition, heterocyclic compound may be a multicyclic compound of a heterocyclic compound and at least one of a cyclic alkyl group having 3 to 8 carbon atoms and an aryl group having 6 to 10 carbon atoms.

When the heterocyclic compound is substituted with an alkyl group having 1 to 4 carbon atoms, it is preferable because radicals are stabilized and side reactions between electrolyte solutions can be suppressed. In addition, when substituted with a halogen group or a nitro group, it is preferable because a functional protective film can be formed on the surface of a lithium-based metal, and at this time, the formed functional passivation layer is a compacted passivation layer, and thus has an advantage of being stable, enabling uniform deposition of the lithium-based metal and suppressing side reactions between the polysulfide and the lithium-based metal.

Specific examples of the heterocyclic compound may be furan. 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, 2,5-dimethylthiophene and the like. Among these, it is preferable to use 2-methylfuran as the first solvent.

The first solvent comprising such a heterocyclic compound may be contained in a volume ratio of 5 or more and less than 95, preferably 10 to 80, and more preferably 15 to 60, relative to 100 volume ratio of the total organic solvent (i.e. the first solvent+the second solvent) contained in the electrolyte solution for the lithium secondary battery of the present invention (the remaining volume ratio corresponds to the second solvent). If the first solvent is contained in less than 5 volume ratio relative to 100 volume ratio of the total organic solvent of the present invention, there may be a problem that the ability to reduce the leaching amount of the polysulfide decreases, and thus the increase in the resistance of the electrolyte solution cannot be suppressed, or the protective filler is not completely formed on the surface of the lithium-based metal. In addition, if the first solvent is contained in an amount of 95 volume ratio or more relative to 100 volume ratio of the total organic solvent of the present invention, there is a concern that a problem of decreasing the capacity and lifetime of the battery may occur due to the increase in the surface resistance of the electrolyte solution and the lithium-based metal.

Meanwhile, the first solvent contained in the volume ratio may be contained in an amount of 5 to 95% by weight, preferably 10 to 80% by weight, more preferably 15 to 45% by weight even relative to the total weight of the electrolyte solution for the lithium secondary battery. If the first solvent is contained in an amount of less than 5% by weight relative to the total weight of the electrolyte solution, as the ability to reduce the leaching amount of the polysulfide decreases, the increase in the resistance of the electrolyte solution may not be suppressed, or there is a risk of a problem that the protective film is not completely formed on the surface of the lithium-based metal. If the first solvent exceeds 95% by weight, there may be a problem that the capacity and lifetime of the battery decrease due to the increase in the surface resistance of the electrolyte solution and lithium-based metal.

B) Second Solvent

The second solvent comprises at least one of an ether-based compound, an ester-based compound, an amide-based compound, and a carbonate-based compound, and not only dissolves the lithium salt to give the electrolyte solution a lithium ion conductivity, but also elutes sulfur, which is a positive electrode active material, so that the electrochemical reaction with lithium can proceed smoothly. In the case of the carbonate-based compound, it may be a linear carbonate-based compound or a cyclic carbonate-based compound.

Specific examples of the ether-based compound may be, but is not limited to, at least one selected from the group consisting of dimethyl ether, diethyl ether, dipropylether, methylethylether, methylpropylether, ethylpropylether, dimethoxyethane, diethoxyethane, methoxyethoxyethane, diethylene glycol dimethylether, diethylene glycol diethylether, diethylene glycol methylethylether, triethylene glycol dimethylether, triethylene glycol diethylether, triethylene glycol methylethylether, tetraethylene glycol dimethylether, tetraethylene glycol diethylether, tetraethylene glycol methylethylether, polyethylene glycol dimethylether, polyethylene glycol diethylether, and polyethylene glycol methylethylether. Among these, it is preferable to use dimethoxyethane as the second solvent.

In addition, the ester-based compound may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone. In addition, the amide-based compound may be a conventional amide-based compound used in the art.

In addition, the linear carbonate-based compound may be, but is not limited to, at least one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC).

In addition, the cyclic carbonate-based compound may be, but is not limited to, at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof (fluoroethylene carbonate (FEC), etc.

Meanwhile, the second solvent may be contained in an amount of 1 to 90% by weight, preferably 20 to 85% by weight, more preferably 40 to 80% by weight, relative to the total weight of the electrolyte solution for the lithium secondary battery. If the second solvent is contained in an amount of less than 1% by weight relative to the total weight of the electrolyte solution, there is a concern that the lithium ion conductivity decreases because the lithium salt cannot be sufficiently dissolved, and that sulfur, which is an active material, exceeds the concentration at which it can be dissolved, and thus a problem of precipitation may occur. If the second solvent exceeds 90% by weight, there may be a problem that sulfur, which is an active material, is excessively leached, resulting in a severe shuttle phenomenon of lithium polysulfide and lithium negative electrode and a decrease in lifetime.

C) Lithium Salt

The lithium salt is an electrolyte salt used to increase ion conductivity, and may be used without limitation, as long as it is commonly used in the art. Specific examples of the lithium salt may be at least one selected from the group consisting of LiFSI, LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylate having 4 or less carbon atoms, lithium 4-phenyl borate, and lithium imide. Among these, it is preferable to use LiFSI ($(SO_2F)_2NLi$) as an essential component. In addition, in one embodiment of the present invention, the electrolyte solution may be in a form that does not contain LiTFSI ($(CF_3SO_2)_2NLi$).

The concentration of the lithium salt may be determined in consideration of ion conductivity and the like, and may be, for example, 0.1 to 4 M, preferably 0.2 to 2 M, and more preferably 0.5 to 2 M. the concentration of the lithium salt is less than the above range, it may be difficult to secure ion conductivity suitable for operating a battery. If the concentration of the lithium salt exceeds the above range, as the viscosity of the electrolyte solution increases, the mobility of lithium ions decreases, or the decomposition reaction of the lithium salt itself increases, and thus the performance of the battery may be deteriorated.

In addition, the lithium salt may be contained in an amount of 2 to 45% by weight, preferably 4 to 30% by weight, and more preferably 8 to 25% by weight, relative to the total weight of the electrolyte solution for the lithium secondary battery. If the lithium salt is contained in an amount of less than 2% by weight relative to the total weight of the electrolyte solution, there is a concern that the problem of increasing ion transfer resistance may occur due to insufficient lithium ion conductivity. If the lithium salt exceeds 45% by weight, likewise, there may be a problem that the lithium ion conductivity decreases, and at the same time, the viscosity of the electrolyte increases, thereby increasing the mass transfer resistance.

D) Lanthanum Nitrate

The lanthanum nitrate ($La(NO_3)_3$) is a component used to improve the coulombic efficiency (C.E.) of the battery and ultimately improve the lifetime of the battery, and there is a case where the lanthanum nitrate ($La(NO_3)_3$) is used as a component of an electrolyte solution even before. However, this case contained 1,3-dioxolane (DOL), dimethoxyethane (DME), and LiTFSI in addition to lanthanum nitrate, so it did not fundamentally improve the problem of deteriorating the lifetime of the battery (that is, it is difficult to express the effect of lanthanum nitrate in an electrolyte solution mixed with DOL/DME/LiTFSI).

However, the present invention with improved reactivity and lifetime is derived by changing 1,3-dioxolane (DOL) used as a component of the existing electrolyte solution to 'a solvent comprising a heterocyclic compound containing one or more double bonds and at the same time containing any one of an oxygen atom and a sulfur atom (the first solvent)', while using lanthanum nitrate ($La(NO_3)_3$), and also by changing LiTFSI used as a component of the existing electrolyte solution to 'another lithium salt such as LiFSI'.

The lanthanum nitrate as described above may be contained in an amount of 0.5 to 15% by weight, preferably 1 to 10% by weight, and more preferably 1.5 to 7% by weight, relative to the total weight of the electrolyte solution for the lithium secondary battery. If the lanthanum nitrate is contained in an amount of less than 0.5% by weight relative to the total weight of the electrolyte solution, there is a risk of problems that the degree of improvement of the coulombic efficiency of the battery becomes insignificant and thus the degree of improvement of the lifetime becomes also insignificant. If the lanthanum nitrate exceeds 15% by weight, any further advantage of the use of lanthanum nitrate may not appear.

E) Additive Comprising Lithium Nitrate

In addition, the electrolyte solution for the lithium secondary battery according to the present invention basically contains lithium nitrate ($LiNO_3$) and further contains at least one selected from the group consisting of potassium nitrate ($KNO_3$), cesium nitrate ($CsNO_3$), magnesium nitrate ($Mg(NO_3)_2$), barium nitrate ($Ba(NO_3)_2$), lithium nitrite ($LiNO_2$), potassium nitrite ($KNO_2$) and cesium nitrite ($CsNO_2$). That is, lithium nitrate ($LiNO_3$), which can be used together with the components of A) to D) described above for the electrolyte solution to show the best performance of the battery, should be used as an essential component. In addition, the additive may be contained in an amount of 1 to 10% by weight, preferably 2 to 8% by weight, more preferably 2.5 to 6% by weight, based on the total weight of the electrolyte solution for the lithium secondary battery. If the content of the additive is less than 1% by weight relative to the total weight of the electrolyte solution for the lithium secondary battery, the coulombic efficiency may be rapidly lowered. If the content of the additive exceeds 10% by weight, the viscosity of the electrolyte solution may increase, making it difficult to operate. Meanwhile, the total content of the additive and lanthanum nitrate is preferably about 2 to 8% by weight relative to the total weight of the electrolyte solution for the lithium secondary battery. In that case, the content ratio of the additive and lanthanum nitrate may be 1 to 4:4 to 1 as a weight ratio, but is not limited thereto.

Next, the lithium secondary battery according to the present invention will be described. The lithium secondary battery comprises a positive electrode, a negative electrode, a separator interposed between the positive electrode and the negative electrode, and the electrolyte solution for the lithium secondary battery. The electrolyte solution for the lithium secondary battery comprises A) the first solvent, B) the second solvent, C) lithium salt, D) lanthanum nitrate and E) an additive comprising lithium nitrate, as described above, and detailed descriptions of these are as described above. In addition, the lithium secondary battery may be any lithium secondary battery commonly used in the art, and among them, a lithium-sulfur battery may be most preferred.

Hereinafter, in the lithium secondary battery according to the present invention, the positive electrode, the negative electrode, and the separator will be described in more detail.

As described above, the positive electrode comprised in the lithium secondary battery of the present invention comprises a positive electrode active material, a binder, and an electrically conductive material. The positive electrode active material may be one that can be applied to a conventional lithium secondary battery, and for example may comprise elemental sulfur ($S_8$), a sulfur-based compound, or a mixture thereof. Specifically, the sulfur-based compound may be $Li_2S_n$ (n≥1), an organosulfur compound or a carbon-sulfur composite (($C_2S_x)_n$: x=2.5~50, n≥2). In addition, the positive electrode active material may include a sulfur-carbon composite, and since the sulfur material alone does not have electrical conductivity, it may be used in combination with an electrically conductive material. The carbon material (or carbon source) constituting the sulfur-carbon composite may have a porous structure or a high specific surface area, and any carbon material may be used as long as it is commonly used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); and activated carbon, and its shape may be spherical, rod-shaped, needle-shaped, plate-shaped, tubular or bulk-shaped, and it can be used without limitation as long as it is commonly used in a lithium secondary battery.

In addition, pores are formed in the carbon material, and the porosity of the pores is 40 to 90%, preferably 60 to 80%. If the porosity of the pores is less than 40%, since lithium ions are not delivered normally, it can act as a resistance component and cause problems. If the porosity of the pores exceeds 90%, a problem of lowering the mechanical strength may occur. In addition, the pore size of the carbon material is 10 nm to 5 μm, preferably 50 nm to 5 μm. If the pore size is less than 10 nm, there may be a problem that lithium ions cannot be transmitted. If the pore size exceeds 5 μm, a short circuit of the battery due to contact between electrodes and safety problems may occur.

The binder is a component that assists in the bonding between a positive electrode active material and an electrically conductive material and the bonding to a current collector, and for example, may be, but is not limited to, at least one selected from the group consisting of polyvinylidenefluoride (PVdF), polyvinylidenefluoride-polyhexafluoropropylene copolymer (PVdF/HFP), polyvinylacetate, polyvinylalcohol, polyvinylether, polyethylene, polyethyleneoxide, alkylated polyethyleneoxide, polypropylene, polymethyl(meth)acrylate, polyethyl(meth)acrylate, polytetrafluoroethylene (PTFE), polyvinylchloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethylcellulose (CMC), starch, hydroxypropyl cellulose, regenerated cellulose, and mixtures thereof.

The binder is usually added in an amount of 1 to 50 parts by weight, preferably 3 to 15 parts by weight, based on 100 parts by weight of the total weight of the positive electrode. If the content of the binder is less than 1 part by weight, the adhesive strength between the positive electrode active material and the current collector may be insufficient. If the content of the binder is more than 50 parts by weight, the adhesive strength is improved but the content of the positive electrode active material may be reduced accordingly, thereby lowering the capacity of the battery.

The electrically conductive material comprised in the positive electrode is not particularly limited as long as it does not cause side reactions in the internal environment of the battery and has excellent electrical conductivity while not causing chemical changes in the battery. The electrically conductive material may typically be graphite or electrically conductive carbon, and may be, for example, but is not limited to, one selected from the group consisting of graphite such as natural graphite or artificial graphite; carbon black such as carbon black, acetylene black, Ketjen black, Denka black, thermal black, channel black, furnace black, lamp black, and summer black; carbon-based materials whose crystal structure is graphene or graphite; electrically conductive fibers such as carbon fibers and metal fibers; carbon fluoride; metal powders such as aluminum and nickel powder; electrically conductive whiskers such as zinc oxide and potassium titanate; electrically conductive oxides such as titanium oxide; electrically conductive polymers such as polyphenylene derivatives; and a mixture of two or more thereof.

The electrically conductive material is typically added in an amount of 0.5 to 50 parts by weight, preferably 1 to 30 parts by weight based on 100 parts by weight of total weight of the positive electrode. If the content of electrically conductive material is too low, that is, if it is less than 0.5 parts by weight, it is difficult to obtain an effect on the improvement of the electrical conductivity, or the electrochemical characteristics of the battery may be deteriorated. If the content of the electrically conductive material exceeds 50 parts by weight, that is, if it is too much, the amount of positive electrode active material is relatively small and thus capacity and energy density may be lowered. The method of incorporating the electrically conductive material into the positive electrode is not particularly limited, and conventional methods known in the related art such as coating on the positive electrode active material can be used. Also, if necessary, the addition of the second coating layer with electrical conductivity to the positive electrode active material may replace the addition of the electrically conductive material as described above.

In addition, a filler may be selectively added to the positive electrode of the present invention as a component for inhibiting the expansion of the positive electrode. Such a filler is not particularly limited as long as it can inhibit the expansion of the electrode without causing chemical changes in the battery, and examples thereof may comprise olefinic polymers such as polyethylene and polypropylene; fibrous materials such as glass fibers and carbon fibers.

The positive electrode active material, the binder, the electrically conductive material and the like are dispersed and mixed in a dispersion medium (solvent) to form a slurry, and the slurry can be applied onto the positive electrode current collector, followed by drying and rolling it to prepare a positive electrode. The dispersion medium may be, but is not limited to, N-methyl-2-pyrrolidone (NMP), dimethyl formamide (DMF), dimethyl sulfoxide (DMSO), ethanol, isopropanol, water, or a mixture thereof.

The positive electrode current collector may be, but is not limited to, platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), ITO (In doped SnO$_2$), FTO (F doped SnO$_2$), or an alloy thereof, or aluminum (Al) or stainless steel whose surface is treated with carbon (C), nickel (Ni), titanium (Ti) or silver (Ag) or so on. The shape of the positive electrode current collector may be in the form of a foil, film, sheet, punched form, porous body, foam or the like.

The negative electrode is a lithium-based metal, and may further include a current collector on one side of the lithium-based metal. the current collector may be a negative electrode current collector. The negative electrode current collector is not particularly limited as long as it has high electrical conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition, sintered carbon, a non-conductive polymer surface-treated with an electrically conductive material or a conductive polymer may be used. In general, a thin copper foil is used as the negative electrode current collector.

In addition, the shape of the negative electrode current collector can be various forms such as a film having or not having fine irregularities on a surface, sheet, foil, net, porous body, foam, nonwoven fabric and the like. In addition, the negative electrode current collector is in the thickness range of 3 to 500 μm. If the thickness of the negative electrode current collector is less than 3 μm, the current collecting effect is lowered. On the other hand, if the thickness exceeds 500 μm, when folding and then assembling the cell, there is a problem that the workability is reduced.

The lithium-based metal may be lithium or a lithium alloy. In that case, the lithium alloy contains an element capable of alloying with lithium, and specifically the lithium alloy may be an alloy of lithium and at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al.

The lithium-based metal may be in the form of a sheet or foil, and in some cases, may be in a form in which lithium or a lithium alloy is deposited or coated on a current collector by a dry process, or may be in a form in which metal and an alloy in a particle phase are deposited or coated by a wet process or the like.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator enables the transport of lithium ions between the positive electrode and the negative electrode while separating or insulating the positive electrode and the negative electrode from each other. The separator may be made of a porous, nonconductive, or insulating material. The separator may be an independent member such as a film or a coating layer added to the positive electrode and/or the negative electrode.

Examples of the polyolefin-based porous film which can be used as the separator may be films firmed of any polymer alone selected from polyethylenes such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof. Examples of the nonwoven fabric that can be used as the separator is a nonwoven fabric formed by a polymer of polyphenyleneoxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester and the like alone or a mixture thereof. Such nonwoven fabrics include a nonwoven fabric in the form of a fiber to form a porous web, that is, a spunbond or a meltblown nonwoven fabric composed of long fibers.

The thickness of the separator is not particularly limited, but is preferably in the range of 1 to 100 μm, more preferably 5 to 50 μm. If the thickness of the separator is less than 1 μm, the mechanical properties cannot be maintained. If the thickness of the separator exceeds 100 μm the separator acts as a resistive layer, thereby deteriorating the performance of the battery. The pore size and porosity of the separator are not particularly limited, but it is preferable that the pore size is 0.1 to 50 μm and the porosity is 10 to 95%. If the separator has a pore size of less than 0.1 μm or a porosity of less than 10%, the separator acts as a resistive layer. If the separator has a pore size of more than 50 μm or a porosity of more than 95%, mechanical properties cannot be maintained.

The lithium secondary battery of the present invention comprising the positive electrode, the negative electrode, separator, and the electrolyte solution as described above may be manufactured through a process of making the positive electrode face the negative electrode, and interposing a separator therebetween and then injecting the electrolyte solution for the lithium secondary battery according to the present invention.

Meanwhile, the lithium secondary battery according to the present invention can be not only applicable to a battery cell used as a power source of a small device, but also can be particularly suitably usable as a unit battery of a battery module which is a power source of a medium and large-sized device. In this respect, the present invention also provides a battery module in which at least two lithium secondary batteries are electrically connected (in series or in parallel). It is needless to say that the number of lithium secondary batteries comprised in the battery module may be variously adjusted in consideration of the use and capacity of the battery module. In addition, the present invention provides a battery pack in which the battery modules are electrically connected according to a conventional technique in the art. The battery module and the battery pack may be used as a power source for at least one medium and large-sized device selected from power tools; electric cars comprising an electric vehicle (EV), a hybrid electric vehicle (HEV), and a plug-in hybrid electric vehicle (PHEV); electric trucks; electric commercial vehicles; or power storage systems, but the present invention is not limited thereto.

Hereinafter, preferred examples are provided to help understanding of the present invention, but the following examples are only for exemplifying the present invention, and it is apparent to those skilled in the art that various changes and modifications can be made within the scope and spirit of the present invention, and such changes and modifications are within the scope of the appended claims.

Example 1 Manufacture of Lithium Secondary Battery

Preparation of Electrolyte Solution

First, to 81.9% by weight of an organic solvent prepared by mixing 2-methylfuran (the first solvent) and dimethoxyethane (the second solvent) in a volume ratio (v/v) of 5:5, based on the total weight of the electrolyte solution, 2% by weight of lithium nitrate (LiNO$_3$) and 3% by weight of lanthanum nitrate (La(NO$_3$)$_3$) were added and dissolved, so that the concentration of LiFSI (lithium salt) was 0.75 M, to prepare an electrolyte solution. Here, the lanthanum nitrate (La(NO$_3$)$_3$) is prepared by vacuum drying La(NO$_3$)$_3$.6H$_2$O from Aldrich company at 180° C. for 18 hours to remove H$_2$O.

Manufacture of Positive Electrode

Separately, 90 parts by weight of sulfur-carbon (CNT) composite (S/C 70:30 weight ratio) as a positive electrode active material, 5 parts by weight of Denka Black as an electrically conductive material, and 5 parts by weight of styrene butadiene rubber/carboxymethyl cellulose (SBR/CMC 7:3) as a binder were mixed to prepare a positive electrode slurry composition, and then the prepared slurry composition was coated on a current collector (Al Foil), dried at 50° C. for 12 hours, and pressed by a roll press machine to manufacture a positive electrode (at this time, the loading amount was 3.5 mAh/cm$^2$, and the porosity of the electrode was 65%).

Manufacture of Lithium Secondary Battery (Lithium-Sulfur Battery)

The prepared positive electrode and the lithium metal negative electrode having a thickness of 150 μm were positioned to face each other, a polyethylene (PE) separator was interposed therebetween, and the prepared electrolyte solution was injected to manufacture a coin cell type lithium-sulfur battery. Meanwhile, in the manufacture of the battery, a 14 phi circular electrode was punched and used as the positive electrode, and a polyethylene separator was punched with 19 phi and used, and the lithium metal was punched with 16 phi and used.

Example 2 Manufacture of Lithium Secondary Battery

A lithium secondary battery was manufactured in the same manner as in Example 1, except that the amount of lithium nitrate added in the electrolyte solution is changed from 2% by weight to 3% by weight, and the amount of lanthanum nitrate is changed from 3% by weight to 2% by weight.

Example 3 Manufacture of Lithium Secondary Battery

A lithium secondary battery was manufactured in the same manner as in Example 1, except that the amount of lithium nitrate added in the electrolyte solution is changed from 2% by weight to 4% by weight, and the amount of lanthanum nitrate is changed from 3% by weight to 1% by weight.

Comparative Example 1 Manufacture of Lithium Secondary Battery

A lithium secondary battery was manufactured in the same manner as in Example 1, except that the lithium salt in the electrolyte solution is changed from LiFSI to LiTFSI, and the amount of lithium nitrate added is changed from 2% by weight to 5% by weight, and lanthanum nitrate is not used.

Comparative Example 2 Manufacture of Lithium Secondary Battery

A lithium secondary battery was manufactured in the same manner as in Example 1, except that the amount of lithium nitrate added in the electrolyte solution is changed from 2% by weight to 5% by weight, and lanthanum nitrate is not used.

Comparative Example 3 Manufacture of Lithium Secondary Battery

A lithium secondary battery was manufactured in the same manner as in Example 2, except that the lithium salt in the electrolyte solution is changed from LiFSI to LiTFSI.

Comparative Example 4 Manufacture of Lithium Secondary Battery

A lithium secondary battery was manufactured in the same manner as in Example 2, except that the first solvent in the electrolyte solution is changed from 2-methylfuran to 1,3-dioxolane, and the lithium salt is changed from LiFSI to LiTFSI.

Comparative Example 5 Manufacture of Lithium Secondary Battery

A lithium secondary battery was manufactured in the same manner as in Example 2, except that the first solvent in the electrolyte solution is changed from 2-methylfuran to 1,3-dioxolane.

The composition of the electrolyte solutions prepared and used in Examples 1 to 3 and Comparative Examples 1 to 5 are shown in Table 1 below.

TABLE 1

| | Electrolyte solution | | | | |
| --- | --- | --- | --- | --- | --- |
| | First solvent | Second solvent | Lithium salt | Lanthanum nitrate | Additive |
| Example 1 | 2-methylfuran 50% | dimethoxyethane 50% | LiFSI 0.75M | La(NO$_3$)$_3$ 3 wt % | LiNO$_3$ 2 wt % |
| Example 2 | 2-methylfuran 50% | dimethoxyethane 50% | LiFSI 0.75M | La(NO$_3$)$_3$ 2 wt % | LiNO$_3$ 3 wt % |
| Example 3 | 2-methylfuran 50% | dimethoxyethane 50% | LiFSI 0.75M | La(NO$_3$)$_3$ 1 wt % | LiNO$_3$ 4 wt % |
| Comparative Example 1 | 2-methylfuran 50% | dimethoxyethane 50% | LiTFSI 0.75M | — | LiNO$_3$ 5 wt % |
| Comparative Example 2 | 2-methylfuran 50% | dimethoxyethane 50% | LiFSI 0.75M | — | LiNO$_3$ 5 wt % |
| Comparative Example 3 | 2-methylfuran 50% | dimethoxyethane 50% | LiTFSI 0.75M | La(NO$_3$)$_3$ 2 wt % | LiNO$_3$ 3 wt % |
| Comparative Example 4 | 1,3-dioxolane 50% | dimethoxyethane 50% | LiTFSI 0.75M | La(NO$_3$)$_3$ 2 wt % | LiNO$_3$ 3 wt % |

TABLE 1-continued

| | Electrolyte solution | | | | |
|---|---|---|---|---|---|
| | First solvent | Second solvent | Lithium salt | Lanthanum nitrate | Additive |
| Comparative Example 5 | 1,3-dioxolane 50% | dimethoxyethane 50% | LiFSI 0.75M | La(NO$_3$)$_3$ 2 wt % | LiNO$_3$ 3 wt % |

Experimental Example 1 Evaluation of Coulombic Efficiency of Lithium Secondary Battery The lithium secondary batteries (precisely, lithium-sulfur batteries) prepared in Examples 1 to 3 are charged and discharged at 0.1 C for 3 cycles, then continuously, charged at 0.2 C, and discharged at 0.3 C to evaluate the coulombic efficiency of the batteries. At that time, the range of the voltage used was set to 1.8~2.5 V (i.e., the discharging was set up to 1.8 V, and the charging was set up to 2.5 V), and the evaluation temperature was set to 25° C.

FIG. 1 is a graph showing coulombic efficiency, discharging capacity, and lifetime performance of the lithium secondary battery manufactured according to an embodiment of the present invention. All of the lithium-sulfur batteries of Examples 1 to 3, in which lanthanum nitrate (La(NO$_3$)$_3$) was applied to the electrolyte solution, had excellent coulombic efficiency as shown in FIG. 1. In general, as the content of lanthanum nitrate increased, the coulombic efficiency also tended to increase. Through this, it was confirmed that when lanthanum nitrate is used, the coulombic efficiency that affects the lifetime performance of the lithium-sulfur battery is increased. Meanwhile, it was confirmed that in terms of lifetime performance, the lithium-sulfur battery of Example 2 using lanthanum nitrate in an amount of 2% by weight and lithium nitrate in an amount of 3% by weight is the best.

Experimental Example 2 Evaluation of Lifetime Characteristics and Discharging Capacity of Lithium Secondary Battery The lithium secondary batteries (exactly, lithium-sulfur batteries) prepared in Example 2 (Example 2, which has the best lifetime performance among Examples 1 to 3, was selected) and Comparative Examples 1 to 5 were charged and discharged at 0.1 C for 3 cycles, charged at 0.2 C, and discharged at 0.3 C to evaluate the coulombic efficiency of the batteries. At that time, the range of the voltage used was set to 1.8~2.5 V (i.e., the discharging was set up to 1.8 V, and the charging was set up to 2.5 V), and the evaluation temperature was set to 25° C.

FIGS. 2 and 3 are graphs showing coulombic efficiency, discharging capacity, and lifetime performance of lithium secondary batteries manufactured according to an embodiment of the present invention and a comparative example. As shown in FIGS. 2 and 3, the lithium-sulfur battery of Example 2, which uses lanthanum nitrate as an electrolyte solution, uses 2-methylfuran instead of 1,3-dioxolane (DOL) as the first solvent, and uses LiFSI instead of LiTFSI as the lithium salt, showed excellent coulombic efficiency as well as excellent lifetime performance and discharging capacity, as compared to all of the lithium-sulfur batteries of Comparative Examples 1 to 5, in which lanthanum nitrate is not used as an electrolyte solution, 1,3-dioxolane is used as the first solvent, or LiTFSI is used as a lithium salt. In particular, in the case of Comparative Example 4 having the same composition as the composition of the electrolyte solution disclosed in the non-patent prior art document (ACS APPLIED MATERIALS & INTERFACES 2016, 8, P. 7783-7789), the worst result was found in the evaluation of lifetime performance and discharging capacity.

Through the above, it was shown that the lithium-sulfur battery including the electrolyte solution of the present invention is superior in all of the evaluation of coulombic efficiency, lifetime performance, and discharging capacity to the lithium-sulfur battery disclosed in the non-patent prior art document. There is a difference in that in the case of the non-patent prior art document, the battery is evaluated under the condition of discharging at 0.2 C. However in general, when the C-rate is low, although the discharging capacity is rather high, it can be seen from the drawings in the non-patent prior art document (FIG. 4) that the discharging capacity is much lower than that of Examples 1 to 3 (the condition of discharging at 0.3 C) of the present invention (FIG. 4 is a graph showing coulombic efficiency, discharging capacity, and lifetime performance of a typical lithium secondary battery, and more precisely, it is a graph shown in 'FIG. 4' of the non-patent prior art document (ACS APPLIED MATERIALS & INTERFACES 2016, 8, P. 7783-7789)).

The invention claimed is:

1. An electrolyte solution for a lithium secondary battery, comprising:
   a first solvent comprising 2-methylfuran;
   a second solvent comprising dimethoxyethane;
   a lithium salt comprising LiFSI((SO$_2$F)$_2$NLi);
   lanthanum nitrate;
   and an additive comprising lithium nitrate,
   wherein the electrolyte solution for the lithium secondary battery does not contain LiTFSI ((CF$_3$SO$_2$)$_2$NLi),
   wherein the electrolyte solution for the lithium secondary battery does not contain 1,3-dioxolane (DOL),
   wherein a total content of the additive and lanthanum nitrate is 2% to 8% by weight relative to a total weight of the electrolyte solution for the lithium secondary battery,
   and wherein a content ratio of the additive and lanthanum nitrate is 1 to 4:4 to 1 as a weight ratio.

2. The electrolyte solution for the lithium secondary battery according to claim 1,
   wherein the additive further comprises at least one selected from the group consisting of potassium nitrate, cesium nitrate, magnesium nitrate, barium nitrate, lithium nitrite, potassium nitrite and cesium nitrite.

3. A lithium secondary battery, comprising:
   a positive electrode;
   a negative electrode;
   a separator interposed between the positive electrode and the negative electrode; and
   the electrolyte solution for the lithium secondary battery of claim 1.

4. The lithium secondary battery according to claim 3, wherein the lithium secondary battery is a lithium-sulfur battery.

* * * * *